D. COLLINS.
VEHICLE WHEEL.
APPLICATION FILED MAR. 15, 1920.

1,393,504. Patented Oct. 11, 1921.

Daniel Collins.
INVENTOR

BY Victor J. Evans
ATTORNEY

WITNESS:

UNITED STATES PATENT OFFICE.

DANIEL COLLINS, OF NEW YORK, N. Y.

VEHICLE-WHEEL.

1,393,504.

Specification of Letters Patent.   Patented Oct. 11, 1921.

Application filed March 15, 1920. Serial No. 365,853.

*To all whom it may concern:*

Be it known that I, DANIEL COLLINS, a citizen of the United States, residing at New York, in the county of New York and State of New York, have invented new and useful Improvements in Vehicle-Wheels, of which the following is a specification.

This invention relates to vehicle wheels, and more particularly, it relates to resilient or spring wheels which obviate the use of pneumatic tires.

Some of the objects of the invention are:—to produce a wheel of the character mentioned whose spokes are unattached at their inner ends, but which are yieldingly supported about the hub of the wheel so as to render it invulnerable against strains and stresses—strains incident to the operation of the vehicle, that is to say, those strains and stresses which come from the vehicle itself, and stresses which result from sudden shocks or jars, which result when the wheel comes into contact with uneven surfaces of the roadway and obstacles in the path of the wheel; to produce a wheel of the character mentioned which embodies means for yieldingly supporting the inner ends of said spokes about the hub of the wheel in unattached relation to the hub, so as to not only absorb the strains and stresses to which it is subjected, but to prevent breaking of the spokes near the inner ends thereof, which frequently occurs in resilient wheel structures where the spokes are fastened to parts of the hub of the wheel; to produce a wheel of the character mentioned which embodies means for preventing excessive relative movements of the resilient means and the spokes with relation to the hub. With these and other objects in view the invention resides in the particular provision and arrangement of parts hereinafter more fully described and illustrated in the accompanying drawing in which:—

Figure 1:
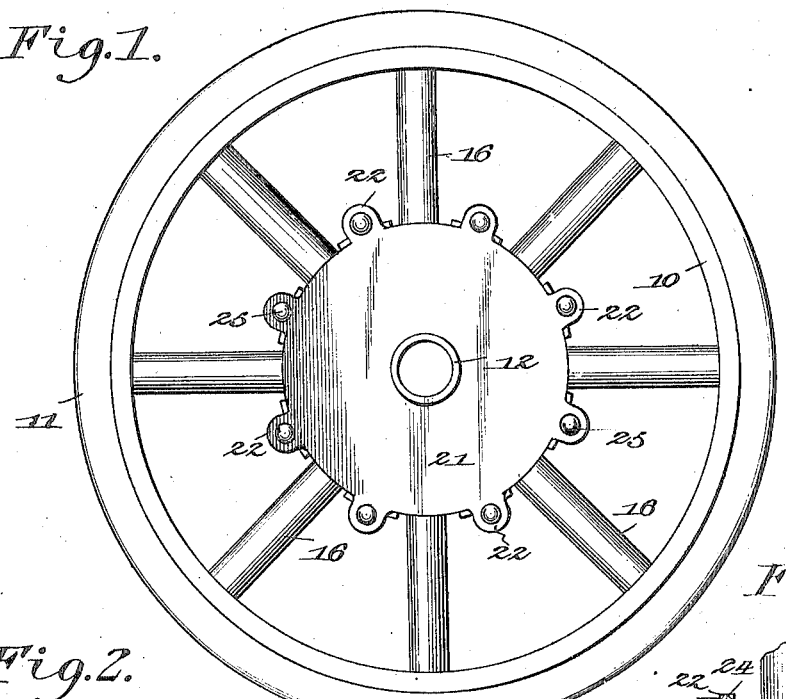
Figure 1 is a side elevation of a wheel constructed in accordance with the present invention.
Figure 2:
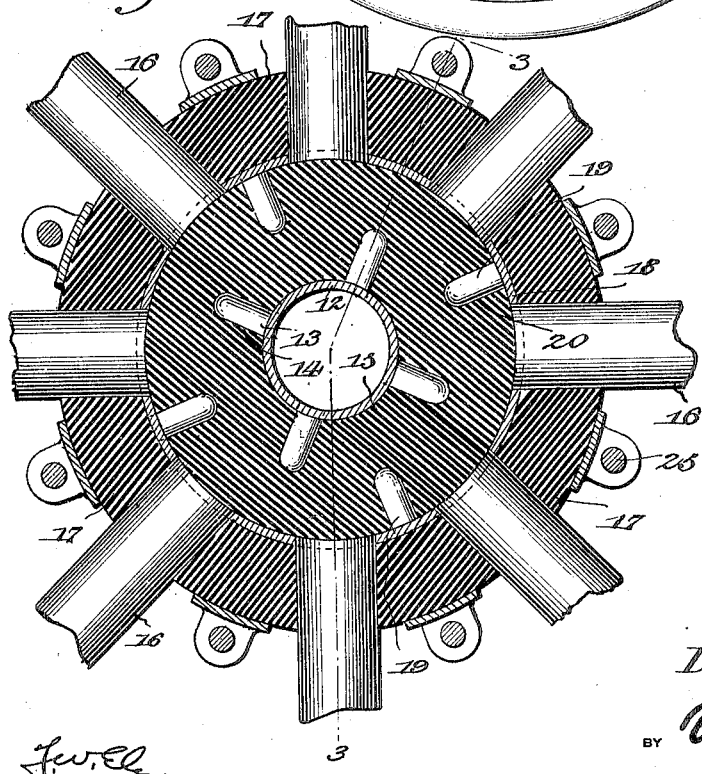
Fig. 2 is an enlarged sectional view of the hub of the wheel and correlated means for yieldingly supporting the inner ends of the spokes of the wheel.
Figure 3:
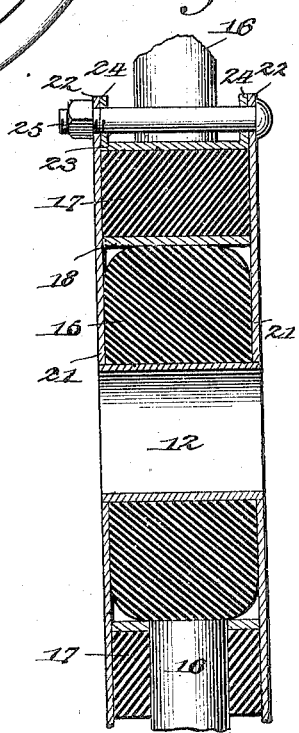
Fig. 3 is a transverse sectional view taken on the line 3—3 of Fig. 2.

Referring now to the drawing, it will be seen, that the wheel will include a felly 10 which supports a tire 11 of solid rubber, steel or any other suitable material. The solid type of tires made from the materials mentioned, is to be utilized in lieu of the more expensive pneumatic tires. The pneumatic effect derived by the use of a pneumatic tire, however, is to be obtained by the use of the means whose construction and arrangement will be presently described. The member 12 which forms the hub of the wheel is provided with radial projections 13, which may be in any desired number, four being shown in the present instance. The projections 13 are received in cavities or recesses 14 in the cushion member 15. The cushion member 15 may be made of any suitable material, and in the present instance, is made of rubber. The cushion member 15 is provided with a central aperture so as to snugly receive and fit the hub member 12. The member 15 is circular in shape, and the outer circumferential edge thereof supports the inner extremities of the spokes 16. In other words, the cushion member 15 is interposed between the spokes and another member—the hub member 12. The inner ends of the spokes 16 are spaced apart and arranged in the spaces between the spokes there are cushion members 17. Interposed between the series of cushion members 17 and the outer circumferential face of the member 15 is a series of metallic plates 18. Certain of the plates 18 are provided with projections 19 which are received in cavities or recesses 20 in the member 15. The projections 13 prevent relative movement of the member 15 with respect to the hub member 12, while the projections 19 prevent relative movement of the series of cushion members 17 with respect to the cushion member 15 and necessarily prevent relative excess movement thereof with respect to the hub member 12. It is to be understood that movement of the inner ends of the spokes within certain prescribed limits may occur, and does occur, in accordance with the spirit of the present invention. The cushion member 15 and the cushion member 17 are confined by plates 21—21 which are provided with spaced apertured ears 22. The ears of one plate are brought into alinement with the ears of the other plate. A series of members 23 are disposed between the plates 21. Each of the members 23 is provided with apertured ears 24 at the extremities thereof and are adapted to aline with the ears 22 of the plates 21, so as to receive the fastening bolts 25, which securely confine the cushion members 15 and 17. The cross sectional width of the members 23 is considerably less than the distance between the spokes so as to permit of the proper yielding action.

From the foregoing, it will be manifest, that there has been provided a disclosure of a vehicle wheel construction which is functionally novel, practical and simple.

While there has been shown the preferred embodiment of my invention, it is to be understood that the right is reserved, to make any and all changes and alterations and modifications within the scope of the claims hereunto appended.

What is claimed as new is:—

1. A vehicle wheel including a felly, a hub, spokes extending inwardly from said felly, cushion means surrounding said hub, securing means for preventing relative movement of the cushion means with respect to the hub, resilient members surrounding said cushion means, plates secured to said hub, members connecting said plates together and normally contacting said resilient members.

2. A vehicle wheel including a felly, a hub, spokes extending inwardly from said felly, cushion means surrounding said hub, resilient members surrounding said cushion means and being movable with relation thereto and disposed between the spokes in contacting relation therewith, plates secured to said hub, members connecting said plates together and normally contacting said resilient members.

3. A vehicle wheel including a felly, a hub, spokes extending inwardly from said felly, cushion means arranged between the hub and the extremities of said spokes, loose resilient members surrounding said cushion means and being disposed between said spokes, in contacting relation therewith, plates secured to said hub, members connecting said plates together and normally contacting said resilient members.

4. A vehicle wheel including a felly, a hub, spokes extending inwardly from said felly, a cushioning member surrounding said hub in contacting relation therewith, securing means for preventing the movement of said member with relation to the hub, loose cushioning members between the spokes in contacting relation therewith, plates secured to said hub, and members connecting said plates together and normally contacting said loose cushioning members and spaced from said spokes.

5. A vehicle wheel including a felly, a hub, spokes extending inwardly from said felly, a rubber member surrounding said hub in contacting relation therewith, securing means on the hub engageable with the rubber member to prevent movement of the rubber member relatively to the hub, loose rubber members arranged between the spokes in contacting relation therewith, confining plates on opposite sides of all of said members, and means for maintaining the relative arrangement of the inner ends of the spokes.

In testimony whereof I have affixed my signature.

DANIEL COLLINS.